(12) United States Patent
Chockalingam et al.

(10) Patent No.: US 10,108,497 B1
(45) Date of Patent: Oct. 23, 2018

(54) POINT-IN-TIME RESTORE USING SQL VDI INCREMENTAL BACKUP OVER SQL VSS SNAPSHOT BACKUP AND RECOVER

(71) Applicant: EMC IP Holding Company LLC, Hopkinton, MA (US)

(72) Inventors: Elango Chockalingam, Bangalore (IN); Acharya Soumen, Bangalore (IN); Sunil Yadav, Bangalore (IN); Manjesh Venkatanarayana Chikkanayakanahally, Bangalore (IN); Krishnendu Bagchi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 373 days.

(21) Appl. No.: 14/869,431

(22) Filed: Sep. 29, 2015

(51) Int. Cl.
*G06F 11/14* (2006.01)
*G06F 17/30* (2006.01)

(52) U.S. Cl.
CPC ...... *G06F 11/1451* (2013.01); *G06F 11/1464* (2013.01); *G06F 11/1469* (2013.01); *G06F 17/30528* (2013.01); *G06F 2201/84* (2013.01)

(58) Field of Classification Search
CPC ............. G06F 11/1469; G06F 11/1471; G06F 11/1451; G06F 2201/80; G06F 2201/815; G06F 2201/84; G06F 17/30088; G06F 17/30233; G06F 17/30575; G06F 17/30581; G06F 11/1448; G06F 11/1435; G06F 11/1446; G06F 11/1461

USPC .... 707/682, E17.007, 645, 639, 649; 714/19
See application file for complete search history.

(56) References Cited

U.S. PATENT DOCUMENTS

| 9,311,375 B1* | 4/2016 | Naik ................. G06F 17/30581 |
|---|---|---|
| 9,569,446 B1* | 2/2017 | Feathergill ........ G06F 17/30088 |
| 2011/0004586 A1* | 1/2011 | Cherryholmes .... G06F 11/1469 707/682 |
| 2011/0161295 A1* | 6/2011 | Ngo ..................... G06F 11/1471 707/639 |
| 2015/0293817 A1* | 10/2015 | Subramanian .... G06F 17/30212 707/645 |
| 2015/0370652 A1* | 12/2015 | He ....................... G06F 11/1451 714/19 |
| 2016/0026536 A1* | 1/2016 | Poluri ................. G06F 11/1451 707/645 |
| 2017/0060699 A1* | 3/2017 | Hohl ................... G06F 11/1469 |

* cited by examiner

*Primary Examiner* — Dennis Truong
(74) *Attorney, Agent, or Firm* — Staniford Tomita LLP

(57) ABSTRACT

Embodiments for a system and method of performing restores of SQL database data, querying a backup history log to determine a sequence of full and incremental backups of the data, first restoring data from a full backup using a SQL volume shadow service (VSS) writer, placing the database into a recovering mode during the first restoring, and second restoring data from an incremental backup using a SQL virtual device interface (VDI) process while the database is in recovering mode until a stop signal is generated to form a hybrid restore process, where the stop signal comprises a STOPAT clause of the SQL VDI process that restores the database content until a given restore time.

17 Claims, 4 Drawing Sheets

POINT-IN-TIME RESTORE USING SQL VDI INCREMENTAL BACKUP OVER SQL VSS SNAPSHOT BACKUP AND RECOVER

TECHNICAL FIELD

Embodiments are generally directed to networked-based data backup, and more specifically to providing point-in-time restores by using both full and incremental backups.

BACKGROUND

The SQL server platform from Microsoft has become one of the main relational database management systems used by small and large-scale enterprises for managing large amounts of enterprise data. The SQL server has the primary task of storing and retrieving data as requested by other software applications that may be running on different computers across a network. To protect data integrity and to guard against catastrophic failures, system administrators almost always use a network backup program to provide periodic backups of system data, such as the database and system data managed by the SQL server. Network backup methods typically utilize file image backups and/or volume image backups. File backups backup individual files, while, a volume backup backs up all data in a specified volume. In the case of data loss or system failure, data can be restored from the data backup. The two primary types of backups are full backups and incremental backups. A full backup backs up all the files and folders of a drive (data source) each time a backup session is performed, while an incremental backup backs up only the files and folders that have been changed or added since the last incremental backup. Incremental backups are typically faster and require less disk space, but restore times can be increased since all incremental backup versions must be available and searching may be required to find latest versions of a file.

Certain software tools have been developed to optimize operation of SQL server data with network backup systems. The NetWorker backup and recovery software from EMC Corp. centralizes, automates, and accelerates data backup and recovery across large scale networks, and a Networker Module for Microsoft (NMM) has been developed to provide backup and restore of SQL server database and transaction logs. This provides integration to the EMC Data Domain (DD) deduplication storage system backup platform. The NMM system provides a single, unified solution that uses Microsoft's Volume Shadow Copy Service (VSS) for snapshot-based (full type) protection and recovery of SQL data, as well as VDI (Virtual Device Interface) for transaction log-based (incremental type) backups. VSS is basically a framework that consists of a set of functions that enable applications to perform backups of volumes, and uses writers, which are applications that store information on disk through the VSS interface; and VDI is a set of application programming interfaces (API's) that enable a vendor to integrate SQL server into its products. VSS allows the system to backup the database files while SQL Server is running by performing snapshot backups, which are backups of a file or folder on a specific volume at a specific point in time.

At present, a main disadvantage of current SQL server backup and restore systems is that the VSS framework does not support incremental backups of a SQL DB. Hence, point in time restore is not possible using SQL VSS snapshot-based backups. On the other hand the SQL VDI framework does support the incremental backup of a SQL DB and hence achieves point in time restore. At present, due to this difference SQL VSS and VDI backups are treated as separate solutions and separate backups, i.e., SQL VSS (snapshot-based) and SQL VDI (stream-based) backups are both performed as separate processes. This is a costly and cumbersome approach that uses two different technologies and results in the same database being backed up under different namespaces (e.g., INCR and FULL).

What is needed, therefore, is a point-in-time restore process that does not require multiple copies of the same data to be backed-up using different products and backup workflows, and that reduces backup time and storage space requirements.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
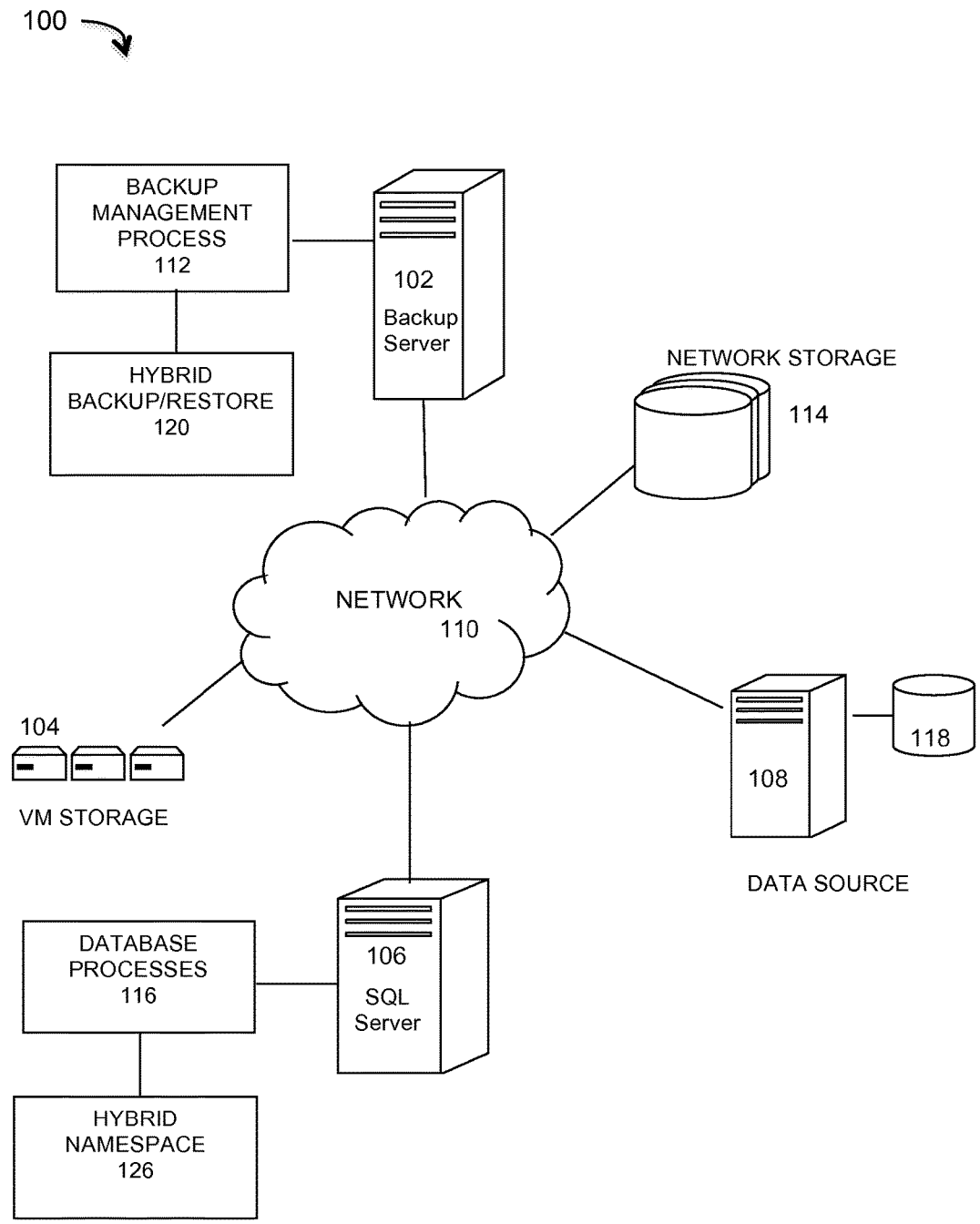
FIG. 1 is a diagram of a large-scale network implementing a hybrid SQL backup and restore process for incremental and full backups, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated backup recovery techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are directed to a system and method for performing point-in-time restores using SQL VDI incremental backups over SQL VSS full backups in a hybrid SQL restore process. It provides a method to achieve a point in time restore of a database using mixed SQL VSS and VDI technology and backups. In an embodiment, SQL VSS full backups are used as a base backup for SQL VDI incremental backups for the point in time restore, and a hybrid SQL namespace is defined to maintain a single product that integrates present solutions based on multiple products. FIG. 1 illustrates a computer network system that implements one or more embodiments of a large-scale network implementing a hybrid SQL restore process for point-in-time restores using both full and incremental backups, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. A separate computer 106 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

System 100 can be used in applications or scenarios where there is a need to backup a database (e.g., Microsoft Exchange database) or network data, or where there is an application in which it would be desirable to backup multiple files (e.g., two or more files) present in a particular folder on the source volume, and such where files can be very large. After backup and possible data loss, a restore function is provided to restore the network back to its state immediately or as near as possible to a point in time before the failure condition occurred.

Embodiments are directed to a process for restoring the point in time data using SQL VSS full backups and SQL VDI incremental backups together in a single SQL hybrid solution. For this embodiment, the backup process employs an NMM framework, which leverages the VSS and VDI technology to protect the Microsoft application data, such as may be managed by the SQL server 106. NMM supports Microsoft application such as Exchange, SharePoint and Hyper-V via VSS technology, and through VDI technology NMM supports Microsoft SQL server. NMM uses VDI and VSS to protect the SQL server databases and SQL server instance(s) running as standalone and virtual server(s). Under present systems, these two methods stores the data separately due to backup technology differences and usage. For example, SQL full backups are traditionally used only to protect SharePoint contents, and SQL VDI technology is traditionally used for protecting all types of SQL DB's like, Normal DB, Mirrored DB and AlwaysOn DB, and so on. In general, the load on the SQL server is minimal using the SQL VSS backup, since SQL server involvement requires only to create a snapshot of the DB and not requires during the data rollover to the backup device. On the other hand, SQL VDI requires the continuous engagement of SQL server until it gets the data stored in the backup device.

Figure 2:
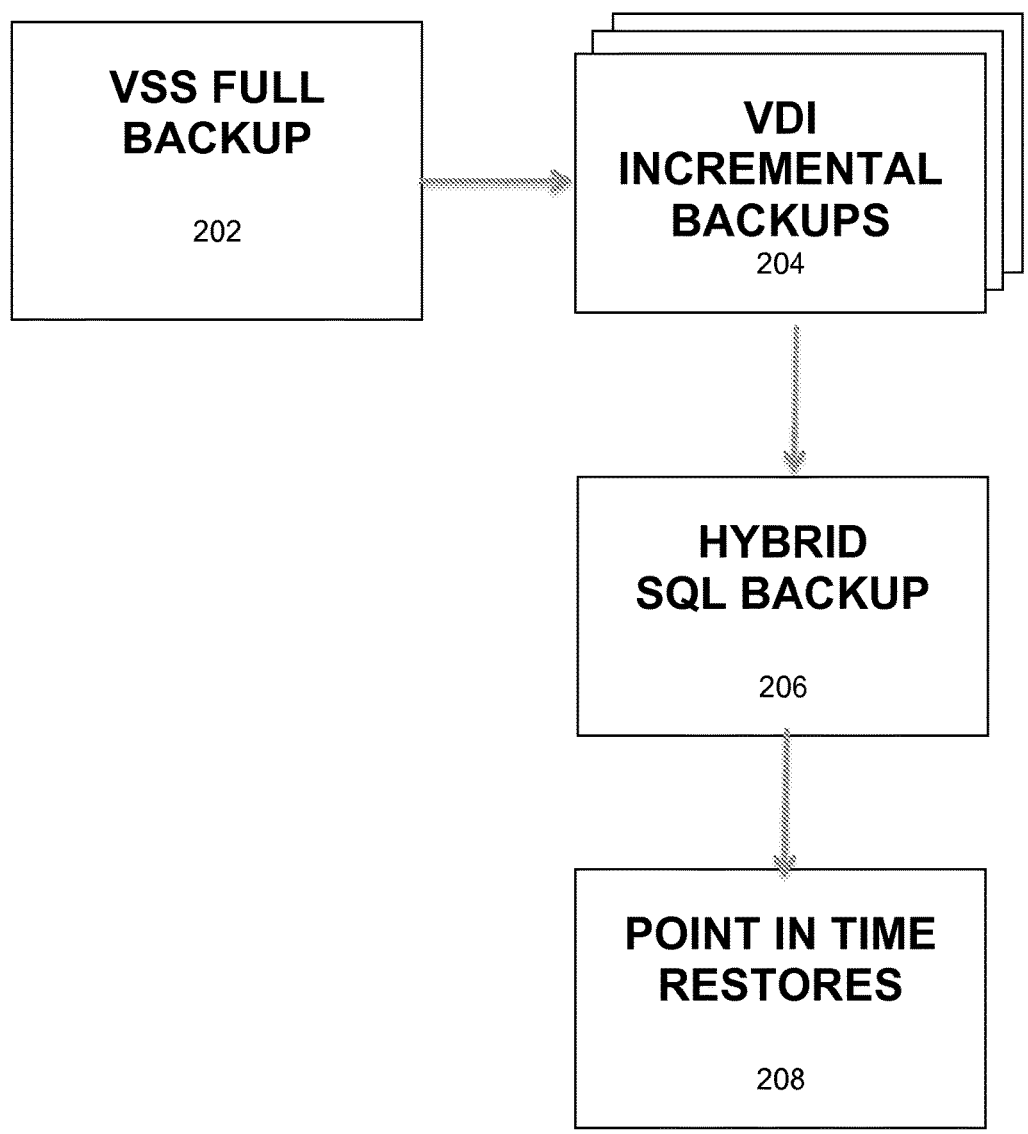
FIG. 2 illustrates the composition of a hybrid SQL backup/restore process as a function of a SQL VSS full backup and a SQL VDI incremental backup, under some embodiments.

In an embodiment, the backup server 102 and SQL server run one or more executable components that implement a hybrid namespace 126 and backup/restore processes 120 that allows point in time restores using SQL VSS snapshot (full) based and SQL VDI incremental backups together, as part of a hybrid SQL solution. This provides a method to achieve a point in time restore of a database using mixed SQL VSS and VDI technology and backups techniques, wherein a SQL VSS full backup is used as a base backup for SQL VDI incremental backups for a point in time restore function. This relationship is illustrated in FIG. 2, which shows the composition of a hybrid SQL backup process 206 as a function of a SQL VSS full backup 202 and a SQL VDI incremental backup 204, under some embodiments. The VSS full backup 202 is used as the base backup for one or more VDI incremental backups 204 to form a hybrid SQL backup 206 that allows for point in time restores 208 of the original VSS full backup.

Figure 3:
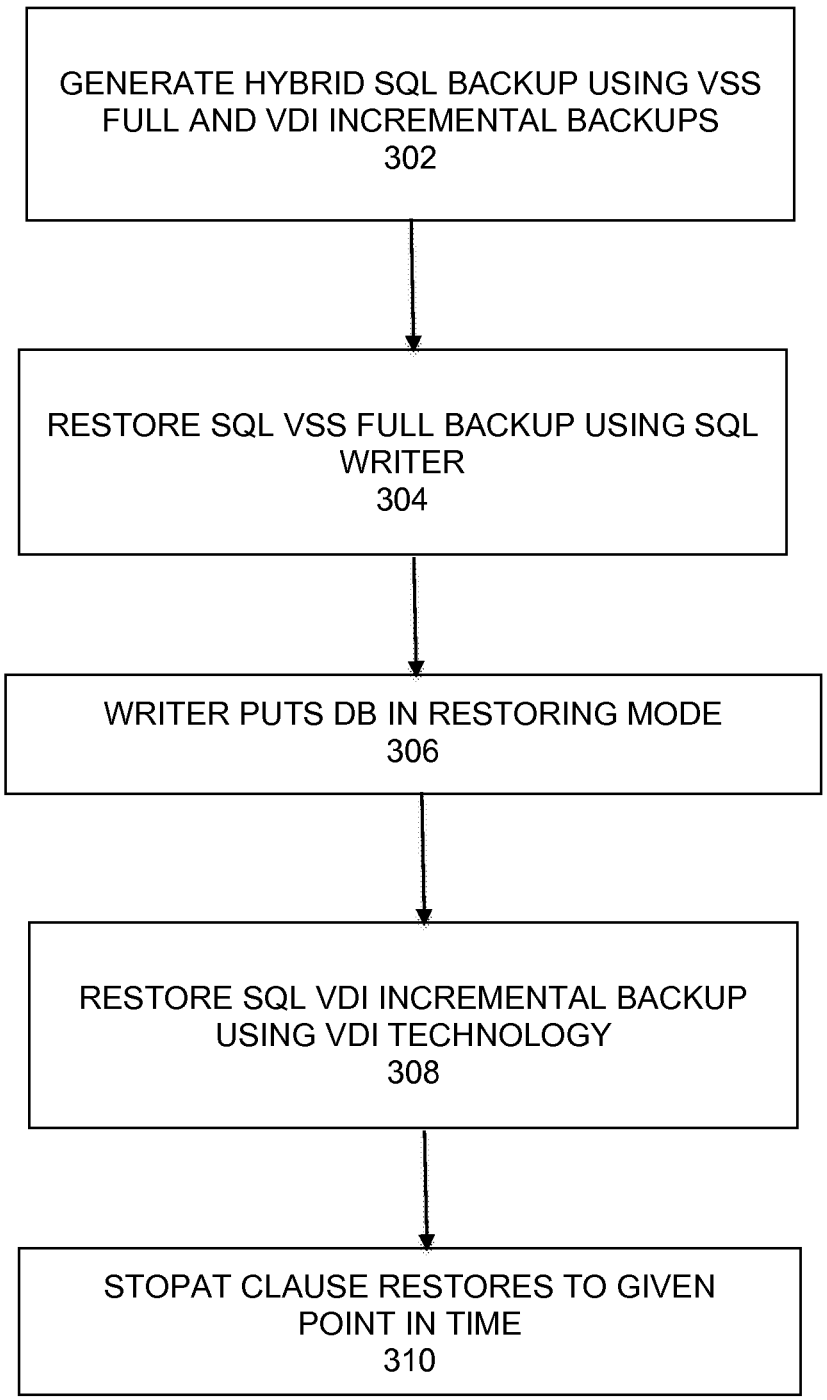
FIG. 3 is a flowchart that illustrates a process of performing point in time restores using a hybrid SQL backup, under some embodiments.

In an embodiment, the backup operations for the VSS full 202 and VDI incremental 204 backups occur as per normal operation and as defined by current operational processes and functions. Together, these form the hybrid SQL backup 206, and with respect to the point in time restore function 208, a specific restore procedure utilizing a special transaction log is used. FIG. 3 is a flowchart that illustrates a process of performing point in time restores using a hybrid SQL backup, under some embodiments. As shown in FIG. 3, the process begins with the generation in step 302 of a hybrid SQL backup using a VSS full backup and one or more VDI incremental backups as shown in FIG. 2. Once the hybrid backup is created, it is available to be used for data restore operations. Upon a restore operation, the process restore the SQL VSS FULL back up using a SQL writer, 304, and the writer puts the database in a restoring mode, 306. The process then restores the SQL VDI INCR backup using known standard VDI processes, 308. A "STOPAT" clause is used to restore the data to a given point in time, 310.

In an embodiment, a transaction log is used prior to bringing the database (or other data corpus) back online.

In an embodiment, each database backup will be stored in the same namespace (e.g., SQL_Hybrid) which can be identified during the restore operation. In general, VSS versus VDI backups are marked using cataloging info in the backup process, or some other similar indexing or marking system. Thus, the system detects the FULL and INCR backup versions from the backup media. Based on the backup technology type, wherein an type attribute will be stored to identify the backup technology either VSS or VDI, the restore mechanism uses the VSS writer or VDI technology to restore the SQL Database. The backup operation is transparent to the user and other system processes, sharing the same attributes, but differing with respect to the lower level restore methods. In general, all restore operations are internal and customers do not need to make any changes or need to be aware of it.

Figure 4:
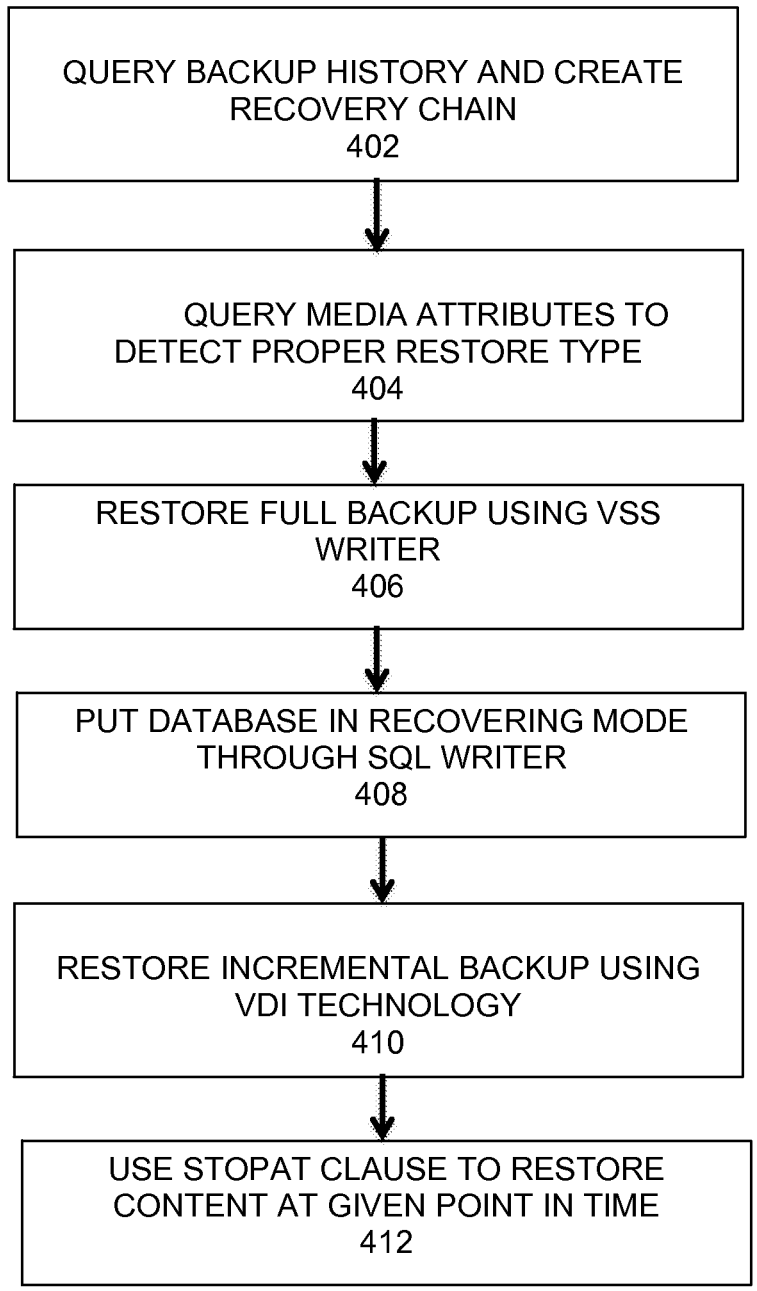
FIG. 4 is a flowchart illustrating certain process steps in performing a data restore on a hybrid SQL backup, under some embodiments.

FIG. 4 is a flowchart illustrating certain process steps in performing a SQL restore on a hybrid SQL backup, under some embodiments. The process of FIG. 4 starts with querying the backup history and creating a recovery chain, 402. This generally involves accessing and analyzing the transaction log with respect to backup operations. For example the log entries might indicate:

FULL backup @ 10:00 am
INCR backup @ 10.15 am

In block 404, the process queries the media attributes (e.g., BKUP_TECH) to detect what type of restore needs to be performed, i.e., SQL VSS or SQL VDI. The process then restore the FULL backup (e.g., the full 10.00 am backup) using SQL VSS writer, 406. The database is then put in "Recovering mode" by calling the SetAdditionalRestores (true) SQL writer function during the VSS restore operation, 408.

The process then restore the one or more incremental backups using the SQL VDI technology on top the database which is in restoring mode and brings the database to ONLINE mode, 410. The STOPAT clause using SQL VDI mechanism is used to restore the content until a given restore time, 412.

In an embodiment, the process of FIG. 4 is implemented in a restore module of process 120 or 126 and is preferably written in C and C++ programming code. This way the database selected will be restored using SQL hybrid restore method, that is, mixing the VSS and VDI technologies.

In an embodiment, a full restore with additional roll-forwards mechanism ca be used in conjunction with the restore process of FIG. 4. This can be used to bring the DB in restoring state after restoring SQL VSS FULL backup. In this module, the requestor can issue a restore specifying the SetAdditionalRestores(true) option, which indicates that the requestor is going to follow up with more roll-forward restore such as log restore, differential restore, and incremental restore. This instructs the SQL server not to perform the recovery step at the end of the recovery operation. In general, this is only possible if the writer metadata was saved during the backup and is available to the SQL writer at the time of the restore. The SQL server service must be running before the requestor directs VSS to perform the restore activity. The SQL writer expects the following sequence:

(1) Preparation to restore each database. This activity involves closing all the file handles in order to allow database files to be copied/mounted by the requestor application.
(2) Files are copied/mounted by the requestor application.
(3) Finalize the restore (with NORECOVERY). The databases are brought online, but into a "Restoring" state.

Conventional SQL backups, differential or logs, can then be used to roll forward the database through the VDI, or by applying the differential restore using the VSS framework.

In an embodiment, the hybrid SQL backup/restore process allows the backup process to work in a more transparent way from a user perspective for SQL databases. Advantages of this approach include performing full backups using SQL VSS technology, which improves the performance of the SQL server by reducing the load of the SQL server; storing the SQL DB backup FULL and INCR images in a single container, which uses less backup storage space; eliminating the need to perform SQL VDI full backups; and using SQL VDI only for restoring SQL incremental backups. There is no deviation during the restore and the all file contents and data are be restored as with any other normal database.

For the sake of clarity, the processes and methods herein have been illustrated with a specific flow, but it should be understood that other sequences may be possible and that some may be performed in parallel, without departing from the spirit of the invention. Additionally, steps may be sub-divided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method for performing restores of SQL database data, comprising:
    accessing the database data as backed up in a hybrid process comprising SQL VDI (Virtual Device Interface) incremental backups over SQL VSS (Volume Shadow Service) full backups, wherein the backed up database data is stored in a single hybrid SQL namespace using a type attribute to mark VDI backups versus VSS backups, to maintain a single product integrating different VDI and VSS backup methods;
    querying a backup history log to determine a sequence of full VSS and incremental VDI backups of the data;
    first restoring data from a full backup using a SQL VSS writer based on a first type attribute;
    placing the database into a recovering mode during the first restoring; and
    second restoring data from an incremental backup using a the VDI process based on a second type attribute while the database is in recovering mode until a stop signal is generated to form a hybrid restore process.

2. The method of claim 1 wherein the stop signal comprises a STOPAT clause of the SQL VDI process that restores the database content until a defined point in time restore time.

3. The method of claim 1 wherein the backup history log comprises a backup transaction log comprising at least one SQL full backup and one or more SQL VDI incremental backups.

4. The method of claim 1 wherein the querying comprises checking the type attribute associated with storage media of a backup target storing the backup data.

5. The method of claim 1 wherein the database is managed by a Microsoft SQL server process.

6. The method of claim 5 wherein the backup process is managed by a Data Domain deduplication backup system using networker modules for Microsoft (NMM) applications.

7. The method of claim 1 further comprising applying one or more additional roll-forward restore operations prior to a data recovery operation, and including at least one of: a log restore, a differential restore, and an incremental restore.

8. The method of claim 1 wherein the hybrid restore process allows for point in time restoration of SQL VSS snapshot based backups.

9. A system configured to perform restores of SQL database data, comprising:

an interface accessing the database data as backed up in a hybrid process comprising SQL VDI (Virtual Device Interface) incremental backups over SQL VSS (Volume Shadow Service) full backups, wherein the backed up database data is stored in a single hybrid SQL namespace using a type attribute to mark VDI backups versus VSS backups, to maintain a single product integrating different VDI and VSS backup methods;

a query component querying a backup history log to determine a sequence of full VSS and incremental VDI backups of the data;

a first backup component restoring data from a full backup using a SQL VSS writer based on a first type attribute;

a management component placing the database into a recovering mode during the first restoring; and a second backup component restoring data from an incremental backup using a the VDI process based on a second type attribute while the database is in recovering mode until a stop signal is generated to form a hybrid restore process.

10. The system of claim 9 wherein the stop signal comprises a STOPAT clause of the SQL VDI process that restores the database content until a defined point in time restore time.

11. The system of claim 9 wherein the backup history log comprises a backup transaction log comprising at least one SQL full backup and one or more SQL VDI incremental backups.

12. The system of claim 9 wherein the query component checks the type attribute associated with storage media of a backup target storing the backup data.

13. The system of claim 9 further comprising a Microsoft SQL server process managing the database.

14. The system of claim 13 further comprising a Data Domain deduplication backup system using networker modules for Microsoft (NMM) applications managing the backup process.

15. The system of claim 9 wherein the management component further applies one or more additional roll-forward restore operations prior to a data recovery operation, and including at least one of: a log restore, a differential restore, and an incremental restore.

16. The system of claim 9 wherein the hybrid restore process allows for point in time restoration of SQL VSS snapshot based backups.

17. A computer program product, comprising a non-transitory computer-readable medium having a computer-readable program code embodied therein, the computer-readable program code adapted to be executed by one or more processors to perform restores of SQL database data by executing instructions implementing a method comprising:

accessing the database data as backed up in a hybrid process comprising SQL VDI (Virtual Device Interface) incremental backups over SQL VSS (Volume Shadow Service) full backups, wherein the backed up database data is stored in a single hybrid SQL namespace using a type attribute to mark VDI backups versus VSS backups, to maintain a single product integrating different VDI and VSS backup methods;

querying a backup history log to determine a sequence of full VSS and incremental VDI backups of the data;

first restoring data from a full backup using a SQL VSS writer based on a first type attribute;

placing the database into a recovering mode during the first restoring; and second restoring data from an incremental backup using a the VDI process based on a second type attribute while the database is in recovering mode until a stop signal is generated to form a hybrid restore process.

* * * * *